UNITED STATES PATENT OFFICE.

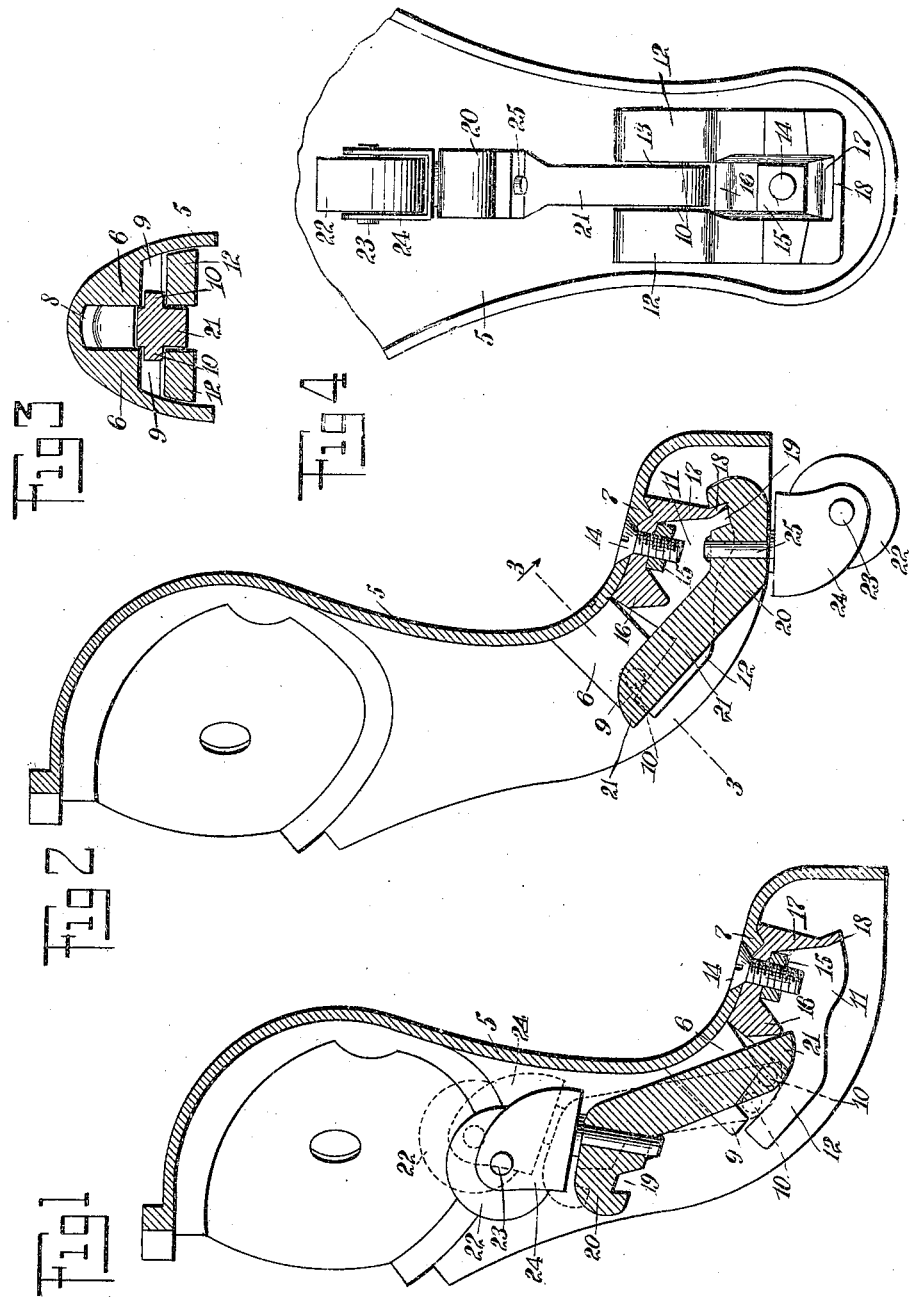

JAMES SHARON, OF CANASERAGA, NEW YORK.

MOUNTING FOR CASTER-WHEELS.

953,492.

Specification of Letters Patent.

Patented Mar. 29, 1910.

Application filed November 17, 1909. Serial No. 528,455.

*To all whom it may concern:*

Be it known that I, JAMES SHARON, a citizen of the United States, and a resident of Canaseraga, in the county of Allegany and State of New York, have invented a new and Improved Mounting for Caster-Wheels, of which the following is a full, clear, and exact description.

Among the principal objects which the present invention has in view are: to provide a mounting for a caster wheel which may be placed in an operative and inoperative position successively, and held in each position securely; to provide a mounting which may be quickly and readily adjusted to form a solid bearing for the caster; and to provide a mounting of the character specified which is simple, durable and economical of construction.

One embodiment of the present invention is disclosed in the structure illustrated in the accompanying drawings, in which like characters of reference denote corresponding parts in all the views, and in which—

Figure 1 is a vertical section of a stove leg having a caster mounted therein, and constructed and arranged in conformity with the present invention, the caster being illustrated in the inoperative position; Fig. 2 is a view similar to that shown in Fig. 1, the caster being arranged in operative position; Fig. 3 is a cross section of the stove leg and mounting taken on the line 3—3 in Fig. 2; and Fig. 4 is a side view of a fragment of the stove leg illustrated in Fig. 1, showing the caster and mounting therefor as drawn outward from the position shown in said figure.

The stove leg 5 illustrated in the drawings resembles in the essentials of construction the usual stove leg. It differs in having cast thereon lugs 6, 6 and a seating lug 7. The lugs 6, 6 conform to the curvature of the side of the leg, and are separated each from the other in the center of the said leg to form a guide opening or slot 8. The lugs 6, 6 are cut away on the under side to form stops 9, 9, against which trunnion extensions 10, 10 strike when the mounting is raised from the position shown in full lines to that shown in dotted lines in Fig. 1 of the drawings. The lug 7 is extended across the leg 5, and is shaped to receive a groove formed in the upper surface of a bracket 11. The bracket 11 is formed with separated hook-like extensions 12, 12, the upper surfaces of which are formed to rest parallel with the under surfaces of the lugs 6, 6 when the said bracket is secured in position. The hook-like extensions 12, 12 are separated to form a channel 13 to guide the mounting for the caster as the same is moved from the inoperative to the operative position, and to form a seat therefor when in the operative position. The body portion of the bracket 11 is rounded to the inner curvature of the leg 5, and is perforated to receive a screw bolt 14. The screw bolt 14 is held by a screw nut 15. The nut 15 is prevented from turning by downwardly extending walls 16 and 17 and the side walls of the body portion of the bracket 11. The four walls form a square recess adapted to hold the nut 15. The walls 16 and 17 serve the further purpose of forming seats to receive the thrust of the caster mounting. The wall 16 is mounted in set relation to the slots formed by the faces of the lugs 6, 6 and the upper surface of the hook-like extensions 12, 12. The depending edge of the wall 16 is located with reference to the slots in such position that when the trunnion extensions 10, 10 are at the lower end of the said slots the end of the caster mounting will extend below the wall 16, as illustrated in Fig. 1 of the drawings. In this position the caster mounting and the caster are maintained in the raised and inoperative position shown in the said figure of the drawings.

The wall 17 is extended downwardly, and at the lower end thereof is provided with an outward edge 18. The edge 18 is formed square to receive and form a seat for a groove 19 formed in the body of the mounting 20. The caster mounting 20 is provided with a body portion from the rear whereof is extended a tail piece 21, from the sides of the end of which are projected the trunnion extensions 10, 10. The groove 19 is cut laterally across the body portion of the mounting 20. The groove is formed substantially as shown in Fig. 2 of the drawings, the outer wall whereof overhanging the edge 18. When the edge 18 is in the groove 19, as shown in Fig. 2 of the drawings, the trunnion extensions 10, 10 rest against the stops 9, 9 of the lugs 6, 6. In this position the mounting 20 supports the stove leg 5, carrying the weight in the groove 19 and on the trunnions 10, 10.

A caster wheel 22 is mounted on pivotal bearings 23 within the usual yoke 24. A spindle 25 is extended upward through the perforation formed in the mounting 20, and headed or otherwise secured in the said mounting. The spindle 25 is arranged to freely revolve within the mounting 20.

It will be observed that when the bracket 11 is disengaged from the leg 5, the mounting 20 and caster wheel connected therewith, may be readily and freely separated, no engagement existing which prevents the tail piece 21 from being removed from between the extensions 12, 12. When, however, the bracket 11 is secured in the position as shown in the drawings, the separation of the mounting 20 from the bracket 11 is rendered impossible by the interposition of the stops 9, 9 of the lugs 6, 6.

When a stove is equipped with legs constructed and arranged with caster mountings and casters, as shown in the accompanying drawings, the operation is as follows: When it is desired to move the stove the casters are dropped from the position shown in Fig. 1 of the drawings by raising the mounting 20 until the end of the tail piece 21 clears the wall 16, dropping forward on to the floor. By raising the leg 5, the mounting 20 and caster are permitted to drop to a vertically dependent position, the trunnion extensions 10, 10 passing to the lower end of the slot formed by the lugs 6, 6 and the extensions 12, 12. In this position the mounting 20 is easily swung to the forward position in which the edge 18 of the wall 17 enters the groove 19. In this position the leg 5 is lowered, bringing the caster wheel 22 in contact with the floor. The weight of the stove being now exerted upon the mounting 20, the latter takes a seat upon the bracket 11, and the lugs 6, 6, by sliding until the edge 18 strikes against the forward wall of the groove 19, and the trunnion extensions 10, 10 strike upon the stops 9, 9 of the lugs 6, 6. In this position the caster, and the mounting are, to all intents and purposes, rigidly set, and the stove may be moved to any desired position, the caster wheels 22 operating in the manner usual to them.

Having moved the stove to the desired position, and wishing to discontinue the use of the casters, the operation just above described is reversed. That is, the leg 5 is raised. The weight of the mounting 20 and caster carried thereby moves the said mounting downward until the forward wall of the groove 19 clears the edge 18, and the caster and mounting swing to the vertical dependent position, the trunnion extensions 10, 10 passing to the lower end of the slot formed by the extensions 12, 12 and the lugs 6, 6. In this position the mounting 20 is moved to one side, and the leg 5 is lowered until the foot thereof rests upon the floor.

The mounting 20 and the caster, are, during the operation, either by hand or automatically, moved to one side away from the front of the leg. The mounting is now raised to the position shown in dotted lines in Fig. 1, in which the trunnion extensions are lifted so that the extreme end of the tail piece 21 avoids the wall 16. When turned, the mounting is dropped until the extreme end extends under and into engagement with the lower edge of the wall 16. In this position the mounting 20 and the caster will remain until the operation described in the previous paragraph be put into execution.

When the caster is in operation it will be observed that the mounting 20, is snugly held between the side walls of the bracket, and thus is prevented from any lateral movement.

Having thus described my invention, I claim as new and desire to secure by Letters Patent:

1. A mounting for caster wheels comprising a bracket having two separated and parallel hook-like members extending from one side of the center of said bracket; a plurality of bearing members rigidly secured on the structure to which said mounting is applied and disposed with relation to said hook-like members to form elongated slots in conjunction therewith; means for securing said bracket to the structure to which said mounting is applied; and an elongated arm having at one end thereof pivot members engaged by said slots and a caster swiveled to the opposite end thereof.

2. A mounting for caster wheels comprising a bracket having formed therein and to one side of the center thereof, an elongated slot; a depending bearing wall on the side of the center thereof opposite the said slot, said wall having a lower edge extended horizontally; an elongated arm having at one end thereof pivot members engaged by said slot and at the opposite end thereof a seat to receive the said depending wall, and intermediate the said pivot members and seat a vertical pivotal bearing for the caster wheel; a caster wheel mounted in said vertical bearing; and means for engaging the said arm with the extended edge of said depending wall in supported relation thereto.

3. A mounting for caster wheels comprising a bracket having formed therein and to one side of the center thereof, an elongated slot; a depending bearing wall on the side of the center thereof opposite the said slot, said wall having a lower edge extended horizontally; an elongated arm having at one end thereof pivot members engaged by said slot and at the opposite end thereof a seat to receive the said depending wall, and intermediate the said pivot members and seat a vertical pivotal bearing for the caster wheel, the forward side of said seat being under-cut to receive the extended edge of said wall; and a caster wheel mounted in said vertical bearing.

4. A mounting for caster wheels comprising a bracket having formed therein and at one side of the center thereof an elongated slot; a depending bearing wall on the side of the center thereof opposite the said slot, said wall having a lower edge extended horizontally; a projection formed on said bracket adjacent to the inner end of said slot and arranged to engage the end of said arm when inverted; an elongated arm having at one end thereof pivot members engaged by said slot and at the opposite end thereof a seat to receive the said depending wall, and intermediate the said pivot members and seat a vertical bearing for the caster wheel, a portion of said arm extended outwardly beyond the said pivot members and adapted to engage said projection when said arm is inverted; and a caster wheel mounted in said vertical bearing.

5. A mounting for caster wheels comprising a bracket having two separated and parallel hook-like members extended from one side of the center of said bracket, and a depending wall having an outward extension located on the opposite side of the center of said bracket, and a projection extended to near the inner end of said hook-like members; a plurality of bearing members rigidly secured on the structure to which said mounting is applied, and disposed with relation to said hook-like members to form elongated slots in conjunction therewith; an elongated arm having at one end thereof pivot members engaged by said slots and at the opposite end thereof a seat to receive the said depending wall, and intermediate the said pivot members and seat a vertical pivotal bearing for the caster wheel; and a caster wheel mounted in said vertical bearing.

6. A mounting for caster wheels comprising a bracket having two separated and parallel hook-like members extended from one side of the center of said bracket, and a depending wall having an outward extension located on the opposite side of the center of said bracket, and a projection extended to near the inner end of said hook-like members; a plurality of bearing members rigidly secured on the structure to which said mounting is applied, and disposed with relation to said hook-like members to form elongated slots in conjunction therewith; an elongated arm having at one end thereof pivot members engaged by said slots and at the opposite end thereof a seat to receive the said depending wall, and intermediate the said pivot members and seat a vertical pivotal bearing for said caster wheel, the forward side of said seat being under-cut to receive the extended edge of said wall; and a caster wheel mounted in said vertical bearing.

7. A mounting for caster wheels comprising a bracket having two separated and parallel hook-like members extended from one side of the center of said bracket, and a depending wall having an outward extension located on the opposite side of the center of said bracket, and a projection extended to near the inner end of said hook-like members, the sides of said bracket forming a square recess to stationarily hold a square screw nut; a plurality of bearing members rigidly secured on the structure to which said mounting is applied, and disposed with relation to said hook-like members to form elongated slots in conjunction therewith; an elongated arm having at one end thereof pivot members engaged by said slots and at the opposite end thereof a seat to receive the said depending wall, and intermediate the said pivot members and seat a vertical pivotal bearing for said caster wheel, the forward side of said seat being under-cut to receive the extended edge of said wall; a caster wheel mounted in said vertical bearing; and a fastening member for securing said bracket to the structure to which said mounting is applied, embodying a screw engaging a nut seated in said recess.

8. In combination with a hollow shell-like-foot having a plurality of separated parallel bearing members; of a caster mounting comprising a bracket adapted to form in combination with said bearing members elongated grooves and having a depending wall removed from said grooves; means for securing the said bracket to said foot; a caster mounting having pivot members extended into said grooves and a bearing portion to rest under said depending wall; and a caster pivotally secured in said mounting intermediate the said bearing members and said depending wall.

9. In combination with a hollow shell-like foot having a plurality of separated parallel bearing members; of a caster mounting adapted to be secured to said foot, and having a plurality of hook-like members adapted to aline with said bearing members and to form in conjunction therewith elongated slots; means for securing the said bracket to said foot; a caster mounting having pivot members extended into said grooves and a bearing portion to rest under said depending wall; and a caster pivotally secured in said mounting intermediate the said bearing members and said depending wall.

10. In combination with a hollow shell-like foot having a plurality of separated parallel bearing members; of a caster mounting comprising a bracket adapted to be secured to said foot and having a plurality of separated and parallel hook-like members adapted to aline with said bearing members, and disposed to form in conjunction therewith elongated slots, said bracket having a depending supporting wall and a projection disposed in close relation to said slots; an elongated arm having extended from the sides thereof pivot members adapted to slide in said slots, said arm having an under-cut end to receive in supported relation the said depending wall; and a caster pivotally mounted in said arm intermediate the said pivot extensions and said under-cut end.

11. In combination with a hollow shell-like foot having a plurality of separated parallel bearing members; of a caster mounting comprising a bracket adapted to be removably mounted in said foot and having a plurality of hook-like members separated and disposed in parallel relation, and adapted to be alined with bearing members to form in conjunction therewith elongated slots, said bracket having formed thereon and on the opposite side of the center of said bearing from the said hook-like members a depending wall the lower edge whereof is flared outwardly, the said bracket being further provided with a second depending wall the edge whereof is in close relation to said slots; an elongated arm having formed in the end thereof an under-cut slot adapted to receive the extended end of said first mentioned depending wall; pivot extensions set out from the side of said arm and engaged by said slots, said pivot extensions being set back from the end of said arm to permit the said end to extend under said second mentioned wall when the said arm is in an elevated position; and a caster pivotally mounted in said arm intermediate the said pivot extensions and said under-cut end.

In testimony whereof I have signed my name to this specification in the presence of two subscribing witnesses.

JAMES SHARON.

Witnesses:
E. N. BENNETT,
BRAD. MILLER,